(12) United States Patent
Sivakumar et al.

(10) Patent No.: US 11,645,766 B2
(45) Date of Patent: May 9, 2023

(54) DYNAMIC SAMPLING FOR OBJECT RECOGNITION

(71) Applicant: International Business Machines Corporation, Armonk, NY (US)

(72) Inventors: Gandhi Sivakumar, Bentleigh (AU); Jayachandu Bandlamudi, Guntur (IN); Rizwan Dudekula, Bengaluru (IN); Ross Davis, Wheelers Hill (AU)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/865,607

(22) Filed: May 4, 2020

(65) Prior Publication Data

US 2021/0343039 A1 Nov. 4, 2021

(51) Int. Cl.
*G06T 7/73* (2017.01)
*G06T 7/292* (2017.01)
*G06T 7/20* (2017.01)
*G06N 5/04* (2023.01)
*G06N 20/00* (2019.01)
*G06F 18/22* (2023.01)
*G06V 20/40* (2022.01)

(52) U.S. Cl.
CPC .............. *G06T 7/292* (2017.01); *G06F 18/22* (2023.01); *G06N 5/04* (2013.01); *G06N 20/00* (2019.01); *G06T 7/20* (2013.01); *G06T 7/74* (2017.01); *G06V 20/44* (2022.01); *G06V 20/46* (2022.01)

(58) Field of Classification Search
CPC ........ G06K 9/6201; G06N 20/00; G06N 5/04; G06T 7/20; G06T 7/74; G06T 2207/20081; G06T 2207/30232; G06T 7/292; G06V 10/40
See application file for complete search history.

(56) References Cited

U.S. PATENT DOCUMENTS

| | | | | |
|---|---|---|---|---|
| 7,110,454 | B1 * | 9/2006 | Chakraborty | G06V 20/40 348/700 |
| 7,477,285 | B1 * | 1/2009 | Johnson | G16H 40/20 725/108 |
| 11,102,508 | B2 * | 8/2021 | Edpalm | H04N 19/527 |

(Continued)

FOREIGN PATENT DOCUMENTS

| | | |
|---|---|---|
| AU | 714213 B2 | 12/1999 |
| KR | 102022496 B1 | 9/2019 |
| WO | 2018165753 A1 | 9/2018 |

OTHER PUBLICATIONS

Bertasius, G., et al., "Object Detection in Video with Spatiotemporal Sampling Networks." Accessed Mar. 10, 2020. 16 pages. ECCV 2018 LNCS. http://openaccess.thecvf.com/content_ECCV_2018/papers/Gedas_Bertasius_Object_Detection_in_ECCV_2018_paper.pdf.

(Continued)

*Primary Examiner* — Ian L Lemieux (74) *Attorney, Agent, or Firm* — Jared L. Montanaro (57) ABSTRACT

A processor may receive a media frame collection. The media frame collection may include two or more frames. The processor may identify, from the media frame collection, a location of an entity. The processor may determine whether the location of the entity is within a threshold location in regard to the other two or more frames in the media frame collection. The processor may display the one or more frames that exceed the threshold location to a user.

17 Claims, 8 Drawing Sheets

(56) References Cited

U.S. PATENT DOCUMENTS

| | | | |
|---|---|---|---|
| 11,138,711 B2* | 10/2021 | Chaudhury | G01N 21/8851 |
| 2005/0078747 A1* | 4/2005 | Hamza | G06V 10/28 |
| | | | 375/240.01 |
| 2007/0154072 A1* | 7/2007 | Taraba | G06V 40/1335 |
| | | | 382/124 |
| 2012/0020518 A1* | 1/2012 | Taguchi | G06T 7/292 |
| | | | 382/103 |
| 2014/0341474 A1* | 11/2014 | Dollar | G06T 7/246 |
| | | | 382/197 |
| 2017/0343481 A1 | 11/2017 | Jahanshahi et al. | |
| 2019/0331301 A1 | 10/2019 | Du et al. | |
| 2020/0151905 A1* | 5/2020 | Ricco | G06T 7/74 |
| 2020/0241716 A1* | 7/2020 | Sowden | G06N 3/08 |
| 2020/0402541 A1* | 12/2020 | Talbot | G06V 10/82 |
| 2021/0103735 A1* | 4/2021 | Das | G08G 1/0133 |
| 2021/0194991 A1* | 6/2021 | Rickeby | H04N 21/4781 |
| 2022/0044424 A1* | 2/2022 | Jayaraman | G06T 7/269 |

OTHER PUBLICATIONS

Luna, E., et al., "Abandoned Object Detection in Video-Surveillance: Survey and Comparison." Published Dec. 5, 2018. Accessed Mar. 10, 2020. 45 pages. PMC. https://www.ncbi.nlm.nih.gov/pmc/articles/PMC6308643/.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

DYNAMIC SAMPLING FOR OBJECT RECOGNITION

BACKGROUND

The present disclosure relates generally to the field of image recognition, and more specifically to automatically identifying an object within a collection of image samples.

Recently, machine learning has complimented image analytic technologies. Due to such a compliment huge processing costs are being incurred by pushing every frame in an image sample to a machine learning engine.

SUMMARY

Embodiments of the present disclosure include a method, computer program product, and system for network-based password policy enforcement. A processor may receive a media frame collection. The media frame collection may include two or more frames. The processor may identify, from the media frame collection, a location of an entity. The processor may determine whether the location of the entity is within a threshold location in regard to the other two or more frames in the media frame collection. The processor may display the one or more frames that exceed the threshold location to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of image recognition, and more specifically to automatically identifying an object within a collection of image samples. While the present disclosure is not necessarily limited to such applications, various aspects of the disclosure may be appreciated through a discussion of various examples using this context.

The evolution of artificial intelligence (e.g., machine learning, deep learning, etc.) has complimented image analytics technology. The ability to identify specific issues within captured streaming footages has become a large need in certain industries, spanning from vigilance/investigation of cracks, chips, etc. within concealed underground pipes, water locks, etc. to identifying proper tree growth with time lapsed images, etc. Processing streaming media for vigilance/investigation requires frame level content of the streaming video. A typical MP4 footage is 65 frames per second and will encompass 234,000 frames per hour. Pushing every frame into an artificial intelligence engine for investigation thus encompasses huge processing costs.

Accordingly, proposed in this disclosure is a subjective sampling method, system, and computer program product to dynamically select samples of frames for pushing to a cognitive engine by sensing the movement of a camera tractor (e.g., tracker, object/entity observing an entity of interest, etc.), size of an entity of interest (e.g., underground pipe, etc.), predicting the size of the entity within a frame, and picking a sample frame.

In some embodiments, a processor may receive a media frame collection. The media frame collection may include two or more frames. The processor may identify, from (e.g., within) the media frame collection, a location of an entity (in some embodiments, an entity may be a feature in a frame). The processor may determine whether the location of the entity is within a threshold location in regard to the other two or more frames in the media frame collection. The processor may display one or more framed that exceed the threshold location to a user.

For example, a machine learning engine may receive a collection of 1 million frames which depict the last 24 hours of a retaining wall. The machine learning engine may identify from the first frame that a main feature of interest is a bowing retaining stake supporting the middle of the retaining wall (e.g., perhaps a user is a testing facility that is trying to identify the strain rate of retaining stake). After identifying the main feature of interest, the machine learning engine may delete the next 10,000 frames as it knows (from previous training algorithms, etc.) that any frames within 10,000 frames does not present enough visual difference to warrant inspection of the bowing angle/degree of the retaining stake. The machine learning engine may continue to look at 10,000 frames at a time until at frame 900,000 it identifies a crack in the bowing retaining stake, at which point, the machine learning engine may look back at the last 1,000 frames at a time (e.g., 899,000) until an exact frame where the crack occurred is identified. The machine learning engine may then present the exact frame to a user with a time stamp of when the crack occurred.

In some embodiments, determining whether the location of the entity is within the threshold location includes the processor comparing the location of the entity to a location of each of the other two or more frames. The location of the entity may be a designated location within the two or more frames. The processor may identify each of the two or more frames that do not exceed the threshold location. The processor may discard each of the two or more frames that do not exceed the threshold location.

For example, a video comprising 1,000 individual frames may be sent to an artificial intelligence (AI) engine for review. The AI engine may identify that at frame 300 that a feature of interest is viewable and the AI engine may then search analyze, simultaneously, both frames 250 and 350 to determine if the feature exists and/or has changed in either of the frames (e.g., if they AI engine is looking for the existence of the feature, the AI engine may be analyzing the frames to determine when and where the feature first appears and/or leave, or if the feature is under constant review, such as a crack in a dam, the AI engine may analyze the frames to see if the crack is smaller at frame 250 and/or lager at frame 350). If the AI engine does not identify the feature in in either frames 250 or 350, the AI engine may discard all frames from 250 to 299 and 301 to 350 as they are determined to not add value in identifying the feature or changes in the feature. The AI engine may then expand the search of the frames to a larger frame location threshold, e.g., analyzing frames 150 and 500, etc. until the feature or change in the feature is identified in another frame. It is noted that such analyzation decreases the computing cost necessary for image/feature recognition as not every frame in a video/media collection need be analyzed.

In some embodiments, the processor may determine, from the comparing of the location of the entity to the location of each of the other two or more frames, a type of entity movement. The processor may adjust the threshold location based on the determining. For example, within a frame collection that includes 1 million frames, the processor may first randomly select frame 700,000 (e.g., location 1, first location, etc.) to analyze and the processor my select a main feature visible in frame 700,000. The processor may then analyze frame 500,000 (e.g., location 2, second location) and determine whether or not the main feature is visible.

If the main feature is visible the processor, due to machine learning training, may categorize the entity movement as stationary as it is unlikely that the main feature would not have moved within 200,000 frames. In such a scenario, the processor may associate a stationary entity movement with the entity providing the frame collection as a camera. Furthering said scenario, the processor, in some embodiments, may access another stationary entity within a physical location of the first identified stationary entity to track a moving main feature with stationary entities.

In some embodiments, if the main feature is not visible the processor may identify further analyze frame 700,000 for secondary features and compare the secondary features to secondary features in frame 500,000. If the secondary features are the same, the processor may designate the entity movement as stationary (e.g., a stationary camera, sensor, etc.). If the secondary features are not the same, the processor may designate the entity movement as agile, as it is likely that the entity that provided the media frames is moving (e.g., movable camera, etc.). In any scenario provided above, the processor may change adjust its analyzation of the 1 million frames (e.g., if the entity movement is classified as stationary, then analyzing frames farther removed from frame 700,000 or if the entity movement is classified as agile, then analyzing frames nearer to frame 700,000 or even accessing media frames from other entities [in such an embodiment and to be discussed more fully later in regard to the FIGS., the original entity providing the frame collection may be designated with a physical, real-world location tag and other accessed entities will be in a threshold location of the physical original entity], etc.).

In some embodiments, the processor may identify that the type of entity movement indicates that the entity is moving within each of the two or more frames. The process may input an entity size predictor. The entity size predictor indicates a minimum size of the entity. For example, a collection of frames submitted from three cameras may be received by a machine learning engine. The machine learning engine may identify that the cameras are being used to track the migration patterns of birds. The machine learning engine may identify that a flock of birds is agile with the frames and generate a predicted logical size of the flock within the frame, e.g., the flock of birds is identified making the total frame size be 1 Mb with the flock being 0.25 Mb of the frame. After predicting the size of the flock within the frames, the machine learning engine will now only look at frames that are at least 1 Mb in size, thus eliminating the need to analyze any frames that are not likely to have the flock.

In some embodiments, the processor may identify that the type of entity movement indicates that the entity is recording the two or more frames. The processor may select a post frame of the two or more frames. For instance, the processor may identify that the frames indicate that an entity is stationary and a stationary entity may be associated with a camera. The processor may then compare either the first or last frame (e.g., post frames) within a frame collection to a random frame within the frame collection to begin finding a metes and bounds of where a feature of interest within the frame collection may be.

In some embodiments, the processor may parse the media frame collection into the two or more frames. The processor may extract metadata from the two or more frames. The metadata may include categorical information and location information. The processor may tag the media frame collection with an indicator that specifies the categorical information and location information. For example, an AI engine may receive a collection of videos from multiple sources, e.g., 100 cameras from a municipality. The AI engine may do a cursory review of the videos by parsing the collection into individual videos and/or individual frames. The AI engine may identify from the frames whether an entity in each of the videos is stationary or agile and/or where each video or frame containing a main feature is within the collection (e.g., video 25 is located at time designation 60 hrs within the collection and is a stationary and focused on a pipeline, video 40 is located at time designation 40 hrs within the collection and is agile and follows the movements of an animal, etc.). It is noted that tagging the videos/frames with metadata tags allows the AI engine to dynamically select areas within the collection that are likely to have a main feature that is being investigated.

In some embodiments, the categorical information may include information on frame size and location information may indicate a designated location for each of the two or more frames from the media frame collection. For example, a frame with a designated main feature may be 2 Mb and the size may be indicated to an AI engine which will then only look at frames that are 2 Mb or more in order to streamline main feature identification in other frames. Further, the frame with the designated main feature may be given a spatial locator within a frame collection in order to identify a location threshold which will allow the AI engine to dynamically jump frames that do not exceed the location threshold as the AI engine has been trained to know that with a substantial certainty that a main feature may not have changed or may not be present within the location threshold (e.g., a crack likely hasn't grown larger from frames 6 to 10, a rabbit likely can't run out of a cameras view within frames 1 to 100, etc.).

Figure 1:
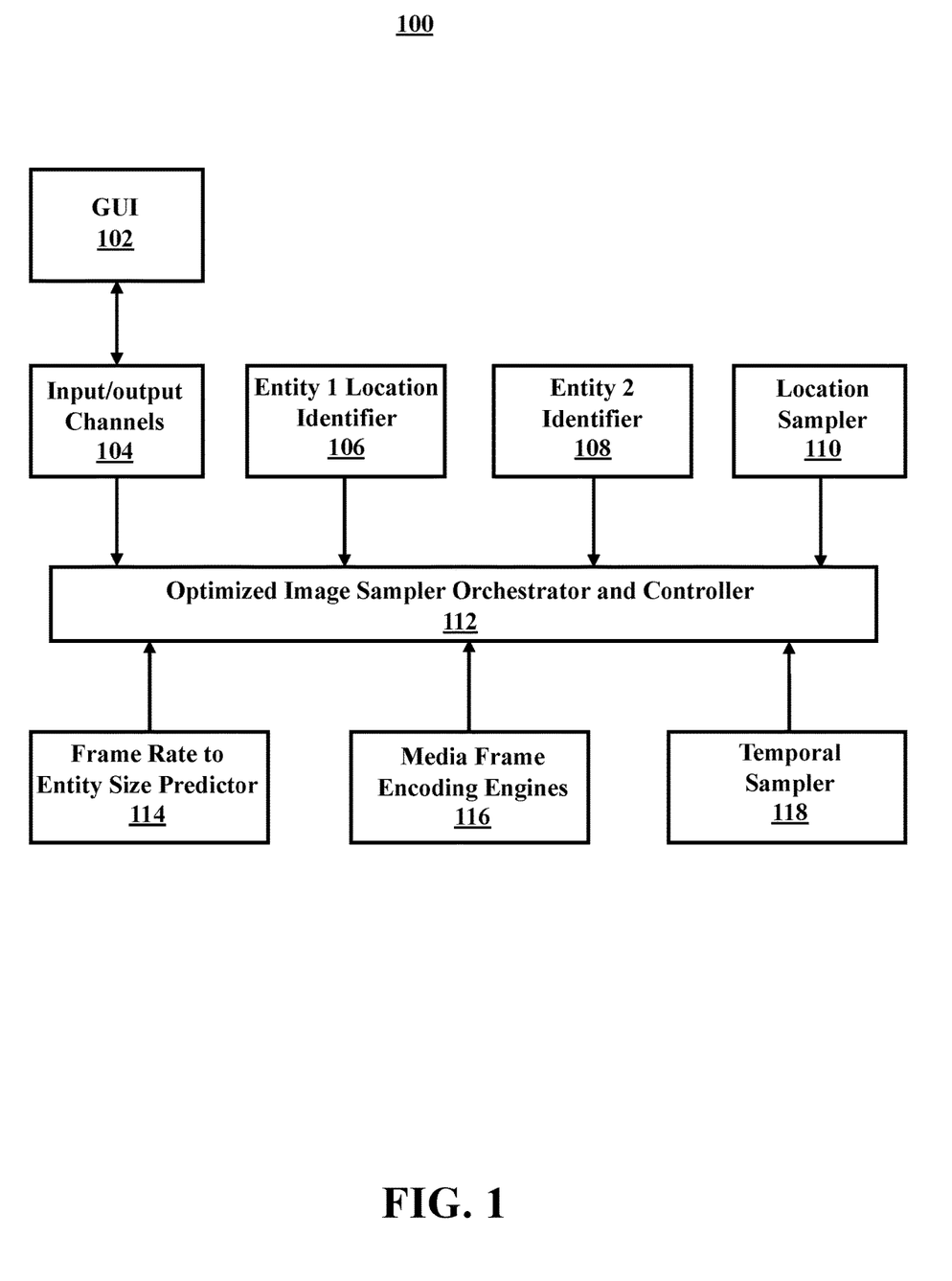
FIG. 1 illustrates a block diagram of an example system for dynamically sampling frames in a media frame collection, in accordance with embodiments of the present disclosure.

Referring now to FIG. 1, illustrated is a block diagram of an example system 100 for dynamically sampling frames in a media frame collection, in accordance with embodiments of the present disclosure. In some embodiments, the system 100 includes a graphical user interface (GUI) 102 for submitting the media frame collection and receiving sample frames (e.g., results, output frames, selected frames, frames that exceed the threshold location, etc.). The system 100 further includes input/output channels 104 in communication with the GUI 102, where the input/output channels 104 provide an interface to subsume media frames and output sample frames (e.g., results, etc.).

The system 100 further includes first entity location identifier 106 (e.g., a tractor location identifier, which leverages existing optical character recognition techniques to automatically extract metadata (e.g., text, tokens, indicators, etc.) from frames to identify the first entity (e.g., tractor, tracker, etc.) location within the frame collection (or, in some embodiments, the physical location of the first entity in the non-digital world, e.g., the first entity location identifier 106 determines from the frames that the first entity is located at a specific latitude/longitude, street location, etc.).

The system 100 further includes a second entity identifier 108 (e.g., entity/object of interest identifier), which inputs one or more entities/objects to be identified within a media frame collection, and, given hue, saturation, population characteristics, predicted size of the one or more entities/objects, position of the object of interest within the frame, etc., the second entity identifier 108 determines the minimum frame size required for a frame to likely have the one or more entities/objects within the frame.

The system 100 further includes a location sampler 110, which identifies whether or not the first entity inhibited dynamic speed of sampling the media frame collection, e.g., the location sampler 110 identifies a category of movement of the first entity and determines if the first entity is stationary or agile. If the first entity is determined to be agile, dynamic speed of sampling the media frame collection may be inhibited because a different area/position an object/entity of interest may be viewed in different locations of the media frame collection and a threshold location may have to be adjusted (e.g., view 100 frames away at a time to now viewing 20 frames away at a time, etc.).

The system 100 further includes a frame rate to entity size predictor 114, which, depending on the minimum size required from the second entity identifier 108 identifies the frame rate and predicts one or more frames from the media frame collection that will have the minimum size.

The system 100 further includes media frame encoding engines 116, which output indicators/tags to be attached to frames and/or the media frame collection based on existing natural language processing algorithms, machine learning algorithms, image recognition algorithms, etc. The system 100 further includes a temporal sampler 110, which performs sampling based on temporal aspects predicted one or more of the components 104-116 described.

In some embodiments, each of the components: input/output channels 104, first entity location identifier 106, second entity identifier 108, location sampler 110, frame rate to entity size predictor 114, media frame encoding engines 116, and temporal sampler 118 are in communication with one another via, and in communication with, an optimized image sampler orchestrator and controller 112.

Figure 2:
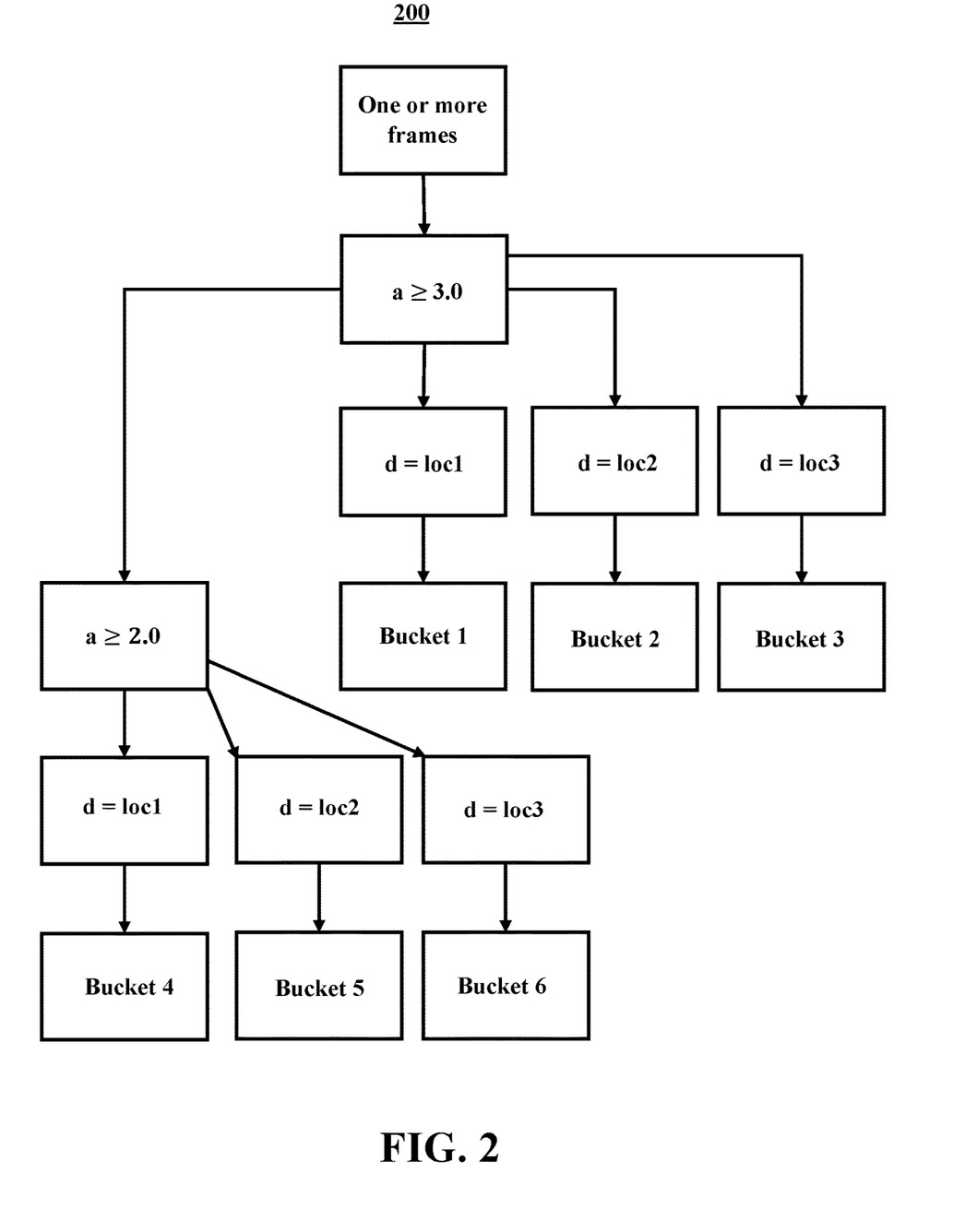
FIG. 2 illustrates a block diagram of an example feature tree for using features within a frame, in accordance with embodiments of the present disclosure.

Referring now to FIG. 2, illustrated is a block diagram of an example feature tree 200 for using features within a frame, in accordance with embodiments of the present disclosure. In some embodiments, the feature tree 200 is utilized by the optimized image sampler orchestrator and controller 112 of FIG. 1.

In some embodiments, the optimized image sampler orchestrator and controller 112 utilizes several user pre-defined inputs for sampling and such inputs are analogous to the features in a model (e.g., identify a red ball in frames, identify a crack increasing, etc.). As proposed, an unsupervised, concise framework to better sample frames within a media frame collection without compromising on quality of resultant frames displayed to a user is present in regard to FIG. 2.

It is noted that, in some embodiments, the feature tree 200 may have multiple features under consideration, for instance: {a,b,c,d,e} and a=[2,4], d={loc1,loc2,loc3}. For simplicity however, as depicted, the feature tree 200 receives frames and the feature tree 200 is constructed using features (a,d). In some embodiments, the feature tree 200 can be constructed even before a media frame collection is received (e.g., a video stream starts, etc.).

Based on features under consideration the number of buckets 1-6 in the feature tree 200 are fixed, as depicted, it includes all possible feature set combinations with 'a' (e.g., white car with red interior, just a white car, etc.) and 'd' includes all categories (e.g., location of white car, etc.). It is noted that buckets are memory segments that accommodate a frame, and which also maintain a centroid vector for each bucket (e.g., which is used to find a location of the frame from the media frame collection).

In some embodiments, when a frame arrives at the feature tree 200 it traverses along the tree based on feature values and is put into a bucket. In case of a first frame arriving, a new bucket will always be retained (e.g., the feature tree 200 will have buckets generated by or upon arrival of any frames) and centroid values of buckets are initialized with vector embeddings obtained from image2vec representations.

In some embodiments, when a new frame arrives to a bucket, it is compared with the centroid of the respective bucket and based on proximity to centroid (e.g., determining if the frame is within a location threshold), the frame will be either discarded or retained.

In some embodiments, if the proximity distance is small (e.g., threshold=0.5), then the frame is discarded as it exhibits characteristics of the centroid, indicating that there is already a similar frame in the sample/bucket. Otherwise, the frame is retained, and the respective bucket centroid is updated to include the feature/object of interest in the bucket.

Accordingly, every frame that traverses through the feature tree 200 will be put into bucket. It is noted that at any given time, every bucket will have either a single frame or none, and that only retained frames are added to the sample for training (e.g., in order to more accurately and quickly determine features/objects/entities of interest in a media frame collection.

Following what is discussed above, and as depicted, the feature tree 200 may receive one or more frames. A frame may be analyzed for a feature value in regard to feature a, and if the feature value is greater than or equal to three, the frame is distributed to feature d, which may be analyzed for a category 1-3 (depicted as loc1-3). Once a category 1-3 is selected, the frame is sent to either of the buckets 1-3 and is compared to a centroid vector of the selected bucket. If the frame is equal to or below a location threshold of the centroid vector, the frame is discarded; if the frame is equal to the location threshold, the frame becomes a sample for training.

Further, if the frame has a feature value that is less than three in regard to feature a, the frame is sent to be evaluated as having a feature value greater than or equal to two in regard to feature a. If the value is greater than or equal to two, the frame is distributed to feature d, which may be analyzed for a category 1-3 (depicted as loc1-3). Once a category 1-3 is selected, the frame is sent to either of the buckets 1-3 and is compared to the centroid vector of the selected bucket. If the frame is equal to or below a location threshold of the centroid vector, the frame is discarded; if the frame is equal to the location threshold, the frame becomes a sample for training.

Figure 3:
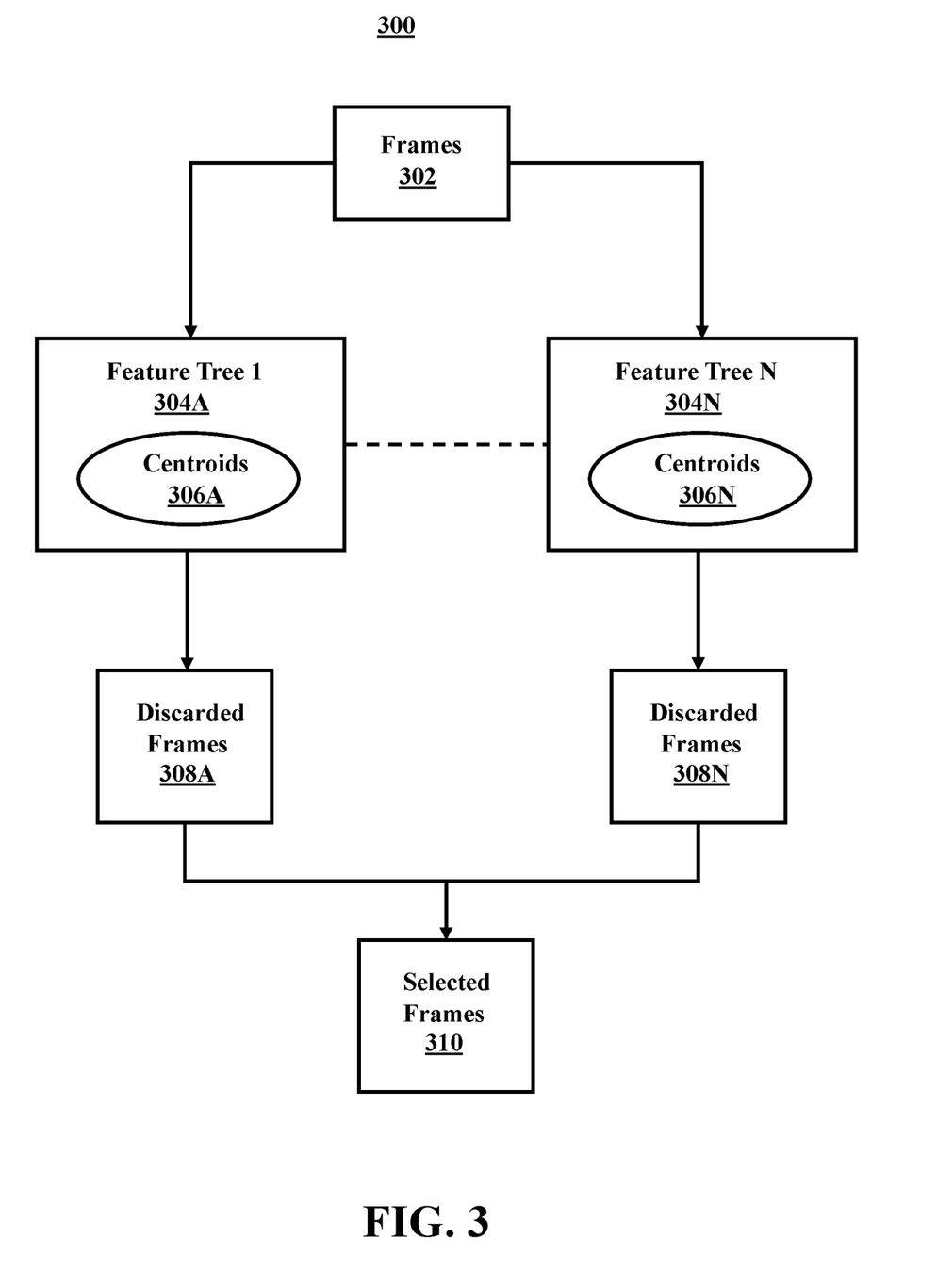
FIG. 3 illustrates a block diagram of an example system for dynamically determining selected frames, in accordance with embodiments of the present disclosure.

Referring now to FIG. 3, illustrated is a block diagram of an example system 300 for dynamically determining selected frames utilizing multiple feature trees 304A-N, in accordance with embodiments of the present disclosure. In some embodiments, the features trees 304-N may include or be substantially similar to the feature tree 200 in FIG. 2.

As depicted, similar to single feature tree 200 in FIG. 2, each of the frames 302 is passed to multiple feature trees 304A-N depending on one or more features identified in each of the respective frames 302 (e.g., proposed is using multiple feature trees 304A-N to analyze multiple features at once/simultaneously). If a frame exceeds any of the centroids 306A-N (e.g., a proximity criterion, location threshold, etc.), the frame is retained as one of selected frames 310, which results in a diverse sample for better training of object recognition. If a frame does not exceed any of the centroid 306A-N, the frame is discarded as one of discarded frames 308A-N and is not retained for training.

Figure 4:
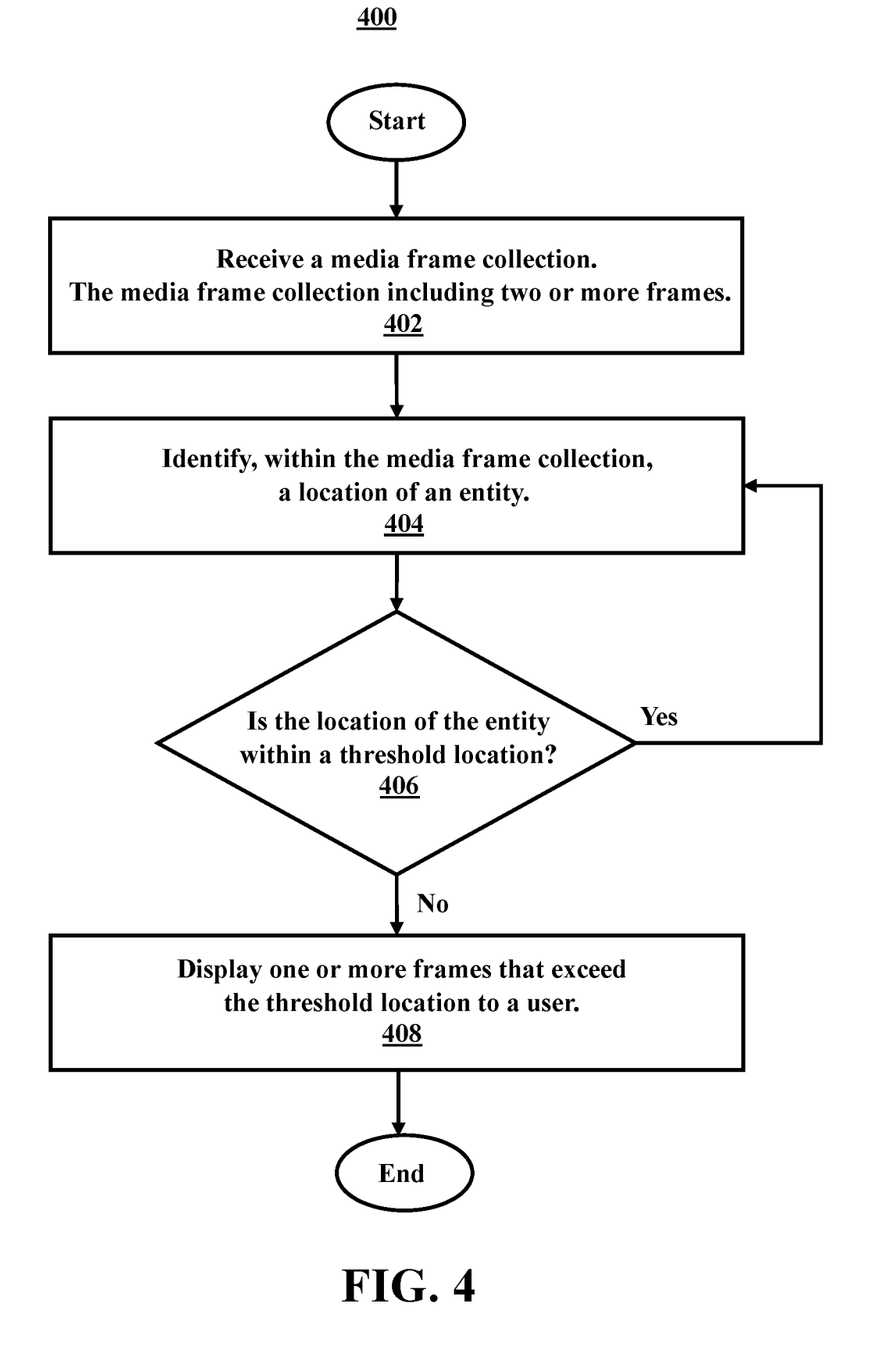
FIG. 4 illustrates a flowchart of an example method for displaying one or more frames to a user, in accordance with embodiments of the present disclosure.

Referring now to FIG. 4, illustrated is a flowchart of an example method 400 for displaying one or more frames to a user, in accordance with embodiments of the present disclosure. In some embodiments, the method 400 is performed by a processor and/or a processor in a system.

In some embodiments, the method 400 begins at operation 402, where a media frame collection is received. The media frame collection may include two or more frames. The method 400 proceeds to operation 404, where a location of an entity is identified from the media frame collection.

The method 400 proceeds to decision block 406. At decision block 406, it is determined whether the location of the entity is within a threshold location in regard to the other two or more frames in the media frame collection (e.g., where the location is in regard to the centroid of the buckets discussed above, etc.). If, at decision block 406, it is determined that the location of the entity is within threshold location (e.g., meets or does not exceed the threshold location), the method 400 repeats operation 404 with a new frame until the threshold location is exceed or until the media frame collection is completely analyzed, in such an embodiment, the method 400 ends.

If, at decision block 406, it is determined that the location of the entity is not within the threshold location (e.g., exceeds the threshold location), the method 400 proceeds to operation 408. At operation 408, one or more frames that exceeded the threshold location are displayed to a user. In some embodiments, at operation 408, the one or more frames that exceeded the threshold location are retained and used for training of object recognition machine learning models. In some embodiments, after operation 408, the method 400 ends.

Figure 5:
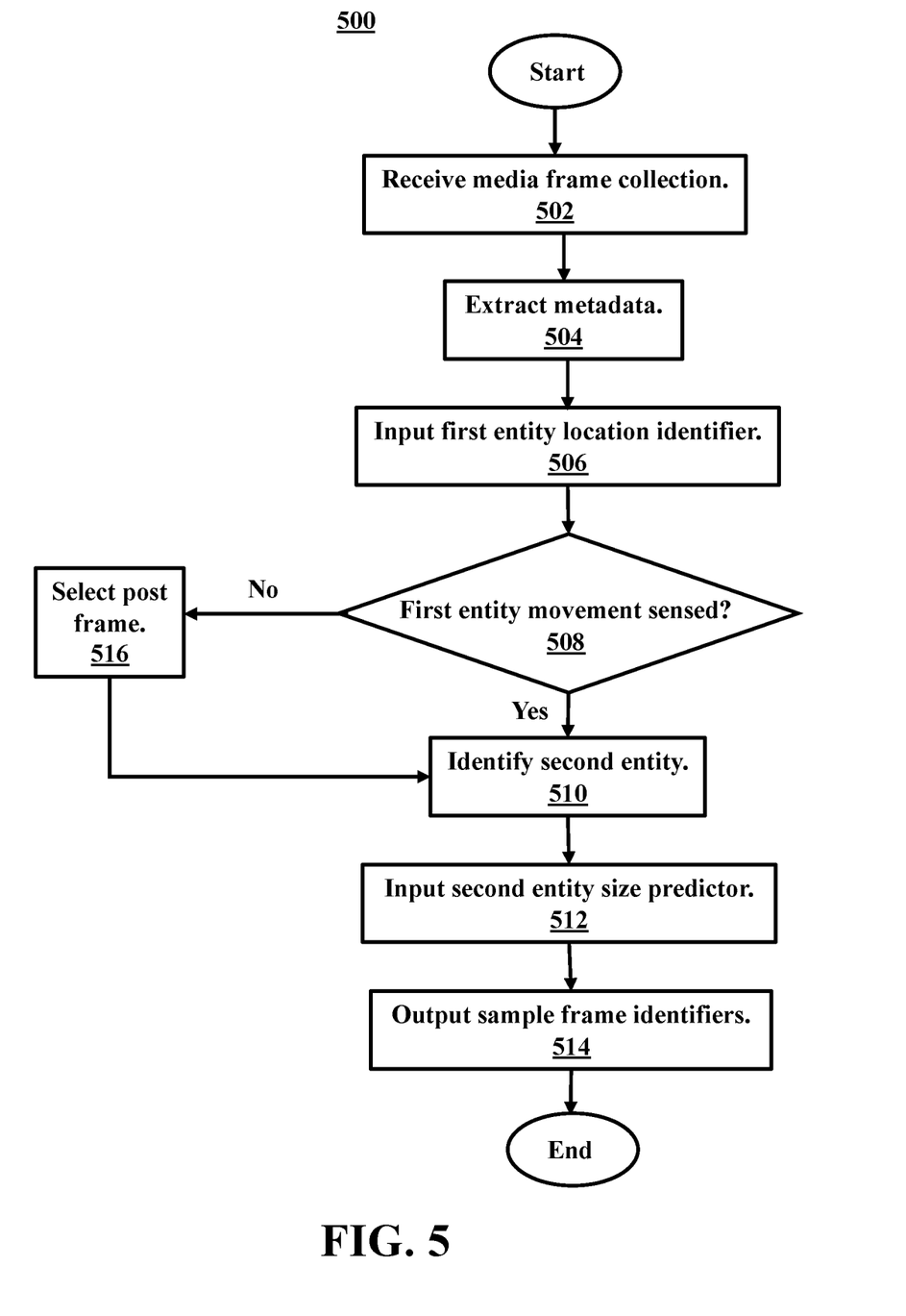
FIG. 5 illustrates a flowchart of an example method for outputting sample frame identifiers, in accordance with embodiments of the present disclosure.

Referring now to FIG. 5, illustrated is a flowchart of an example method 500 for outputting sample frame identifiers to be used in an optimized image sampler, in accordance with embodiments of the present disclosure. In some embodiments, the method 500 is performed by a subjective sampling engine for determining anchor objects for object recognition purposes. It is noted that such an embodiment helps increase the efficiency of object recognition and reduces the computational costs associated with object recognition. That is, traditional object recognition requires analyzing each frame within a media frame collection, whereas the proposed method 500 allows for the training of an object recognition model that allows for the dynamic sampling of a media frame collection based on predictors/identifiers.

Accordingly, in some embodiments, the method 500 begins at operation 502, where a media frame collection is received. The method 500 proceeds to operation 504, where metadata is extracted from the media frame collection (e.g., size of collection, size of frames, objects of interest, etc.). The method 500 proceeds to operation 506, where a first entity location identifier is input from the media frame collection (e.g., placed on a frame in the media frame collection that is identified as showing an object/entity of interest).

The method 500 proceeds to decision block 508, where it is determined whether or not first entity movement is sensed (e.g., by comparing the first entity location identifier to a second location from the media frame collection). If, at decision block 508, it is determined that no first entity movement is sensed (e.g., the entity is a stationary tractor/tracker/camera/etc.), the method 500 proceeds to operation 516. At operation 516, the a post frame is selected (e.g., a first or last frame in the media frame collection is selected. In some embodiments, the media frame collection may comprise multiple distinct videos from one or more sources and a first or last frame in a single video may be selected. In some embodiments, the post frame may be selected by utilizing a location sampler (e.g., sampling frames from the media frame collection until a distinct change in frames is identified). In some embodiments, the method 500 proceeds to operation 510.

In some embodiments, if, at decision block 508, it is determined that first entity movement is sensed (e.g., the entity is a moving tractor/tracker/camera, multiple tractors following a second entity, etc.) the method 500 proceeds to operation 510. At operation 510, a second entity (e.g., object/entity of interest) is identified. In some embodiments, the second entity may be identified by utilizing temporal frame samples or random frame samples fed into a machine learning model. For example, a frames 1 through 10 (e.g., temporal) could be fed to a machine learning model and the same house is shown in each frame and it is determined, with relative certainty (e.g., within an object of interest threshold), that the house is an object of interest; or, frames 1, 10, 20, and 30 could be fed to the machine learning model and the same house is show, and the same determination is made. In some embodiments, the second entity may be identified by utilizing existing algorithms, such as, but not limited to: edge detection, discrete cosine transform, etc.

The method 500 proceeds to operation 512, where a second entity size predictor is input. For example, a processor running the method 500, will, for a frame that includes/depicts/shows the second entity have the minimum size of the second entity computed and the processor will predict other (subsequent and/or predecessor) frames which may likely have the size associated with the second entity, which will help infer more quickly which frames have the best, or better, visualizations of the second entity. In some embodiments, frame rate could be used in helping to predict the other frames (e.g., if a media frame collection is sent at 60 frames-per-second it may be determined that it is optimal to analyze every 60 frames, whereas it may be optimal to analyze every 30 frames if a media frame collection is sent at 10 frames-per-second, etc.)

In some embodiments, the method 500 proceeds to operation 514, where sample frame identifiers are output to a user and/or a machine learning model for training. In some embodiments, after operation 514, the method 500 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6A:
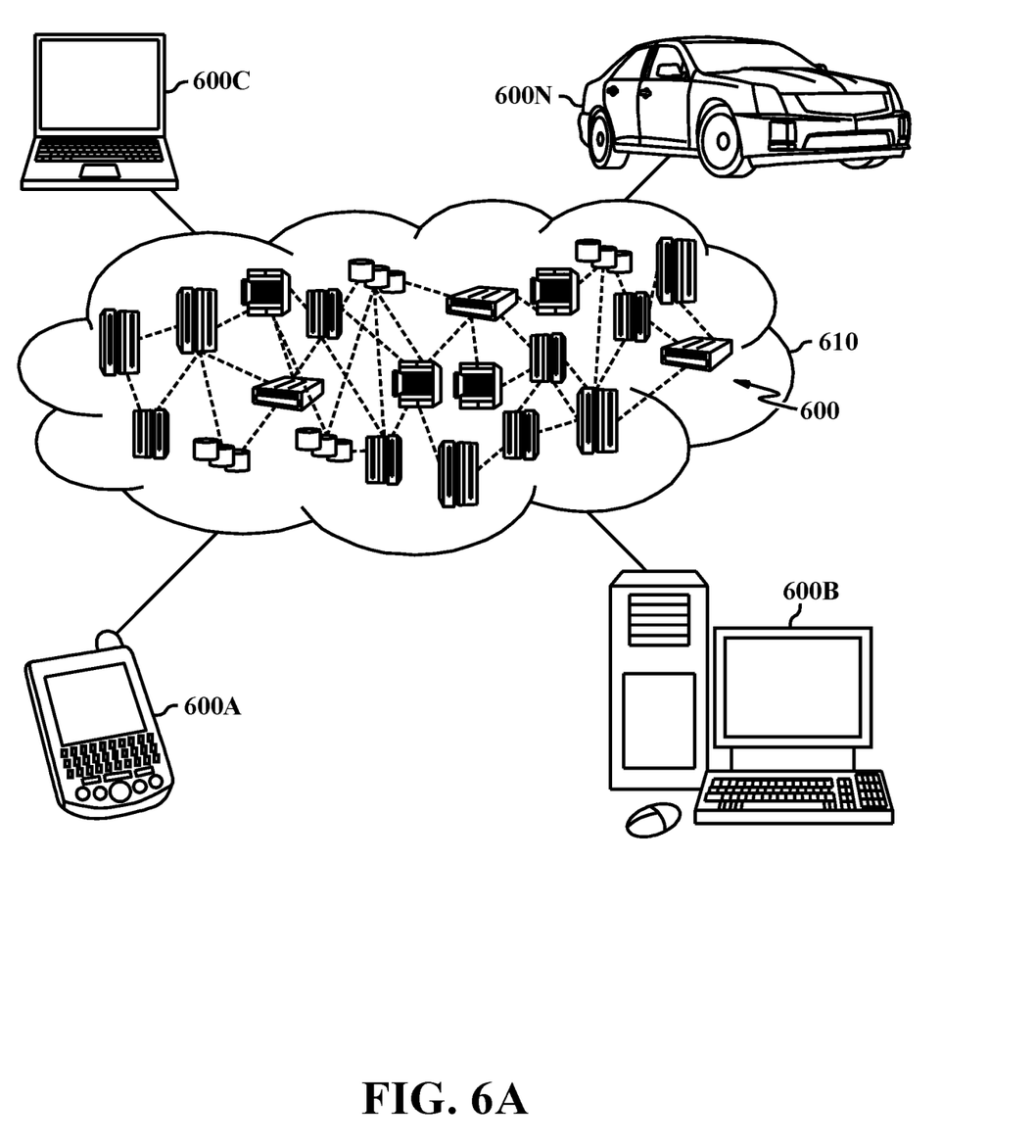
FIG. 6A illustrates a cloud computing environment, in accordance with embodiments of the present disclosure.

FIG. 6A, illustrated is a cloud computing environment 610 is depicted. As shown, cloud computing environment 610 includes one or more cloud computing nodes 600 with which local computing devices used by cloud consumers, such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as Private, Community, Public, or Hybrid clouds as described hereinabove, or a combination thereof.

This allows cloud computing environment 610 to offer infrastructure, platforms and/or software as services for which a cloud consumer does not need to maintain resources on a local computing device. It is understood that the types of computing devices 600A-N shown in FIG. 6A are intended to be illustrative only and that computing nodes 600 and cloud computing environment 610 can communicate with any type of computerized device over any type of network and/or network addressable connection (e.g., using a web browser).

Figure 6B:
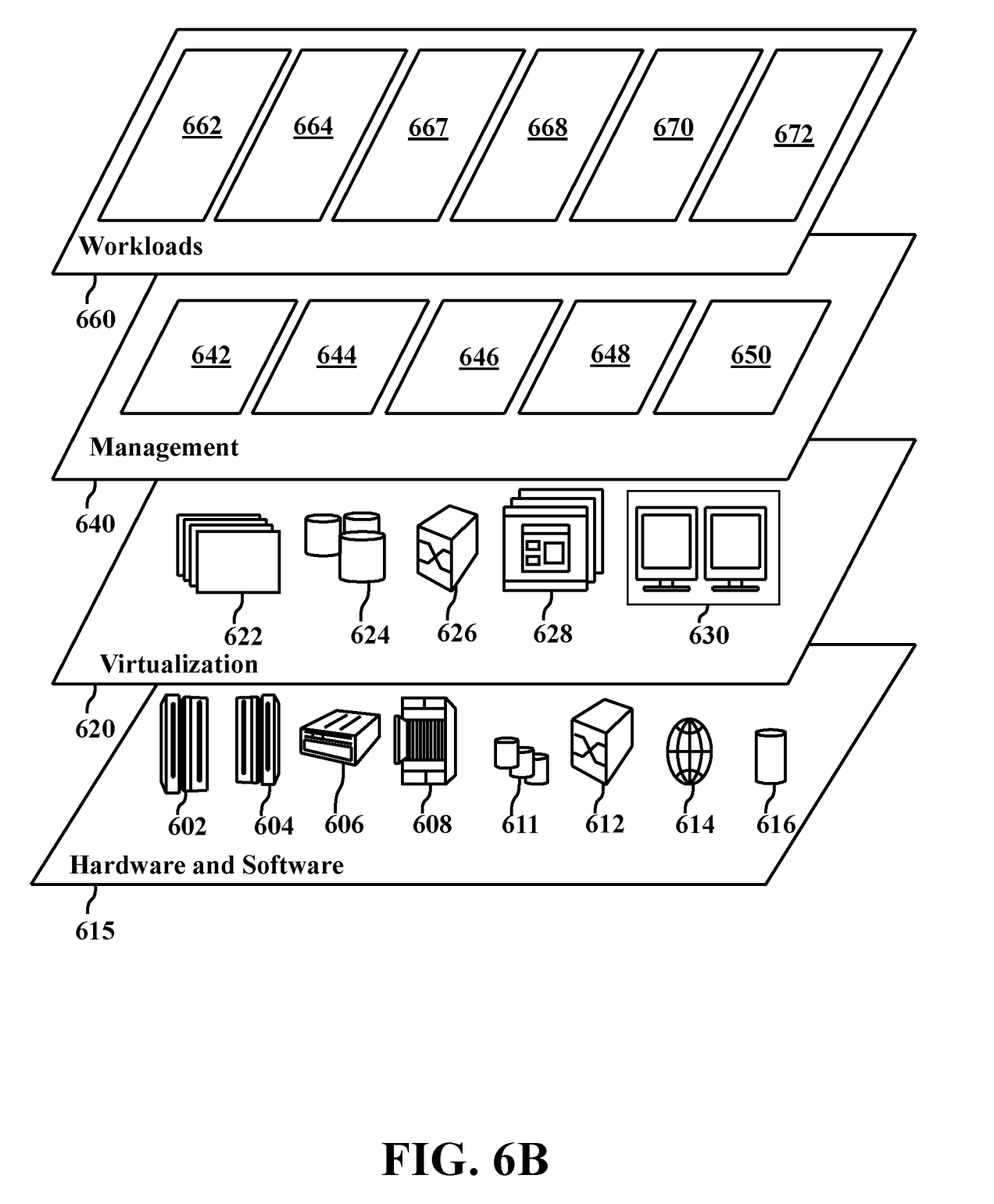
FIG. 6B illustrates abstraction model layers, in accordance with embodiments of the present disclosure.

FIG. 6B, illustrated is a set of functional abstraction layers provided by cloud computing environment 610 (FIG. 6A) is shown. It should be understood in advance that the components, layers, and functions shown in FIG. 6B are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and dynamic object recognition sampling 672.

Figure 7:
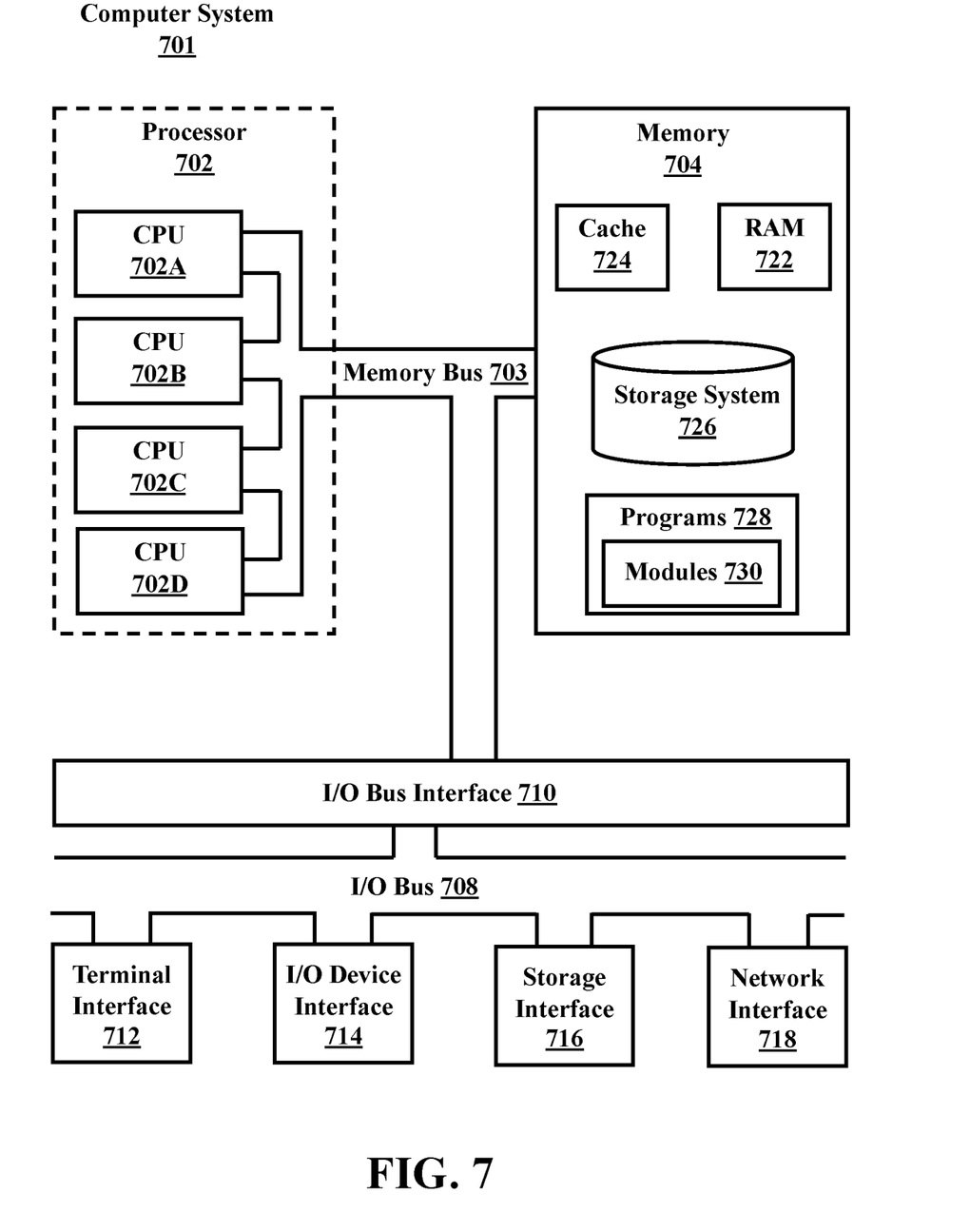
FIG. 7 illustrates a high-level block diagram of an example computer system that may be used in implementing one or more of the methods, tools, and modules, and any related functions, described herein, in accordance with embodiments of the present disclosure.

FIG. 7, illustrated is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure

What is claimed is:

1. A computer-implemented method, the method comprising:
    receiving, by a processor, a media frame collection, wherein the media frame collection includes two or more frames;
    identifying, from the media frame collection, a location of an entity;
    determining whether the location of the entity is within a threshold location in regard to other frames in the media frame collection, wherein determining whether the location of the entity is within the threshold location comprises:
        comparing the location of the entity to a location of each of the other frames, wherein the location of the entity is a designated location within the two or more frames, and wherein the location of the entity is associated with a centroid vector of a bucket,
        identifying each of the other frames that do not exceed the threshold location, and
        discarding each of the other frames that do not exceed the threshold location;
    deleting each of the other frames that do not exceed the threshold location, wherein each of the other frames deleted is associated with the threshold location; and
    displaying one or more frames that exceed the threshold location to a user.

2. The method of claim 1, further comprising:
    determining, from the comparing of the location of the entity to the location of each of the other frames, a type of entity movement;
    adjusting, based on determining the type of entity movement, the threshold location.

3. The method of claim 2, further comprising:
    identifying that the type of entity movement indicates that the entity is moving within each of the two or more frames; and
    inputting an entity size predictor, wherein the entity size predictor indicates a minimum size of the entity.

4. The method of claim 2, further comprising:
    identifying that the type of entity movement indicates that the entity is recording the two or more frames; and
    selecting a post frame of the two or more frames.

5. The method of claim 1, further comprising:
    parsing the media frame collection into the two or more frames;
    extracting metadata from the two or more frames, wherein the metadata includes categorical information and location information; and
    tagging the media frame collection with an indicator that specifies the categorical information and location information.

6. The method of claim 5, wherein the categorical information includes information on frame size, and wherein location information indicates a designated location for each of the two or more frames from the media frame collection.

7. A system comprising:
    a memory; and
    a processor in communication with the memory, the processor being configured to perform operations comprising:
    receiving a media frame collection, wherein the media frame collection includes two or more frames;
    identifying, from the media frame collection, a location of an entity;
    determining whether the location of the entity is within a threshold location in regard to other frames in the media frame collection, wherein determining whether the location of the entity is within the threshold location comprises:
        comparing the location of the entity to a location of each of the other frames, wherein the location of the entity is a designated location within the two or more frames, and wherein the location of the entity is associated with a centroid vector of a bucket,
        identifying each of the other frames that do not exceed the threshold location, and
        discarding each of the other frames that do not exceed the threshold location;
    deleting each of the other frames that do not exceed the threshold location, wherein each of the other frames deleted is associated with the threshold location; and
    displaying one or more frames that exceed the threshold location to a user.

8. The system of claim 7, wherein the processor is further configured to perform the operations comprising:
    determining, from the comparing of the location of the entity to the location of each of the other frames, a type of entity movement;
    adjusting, based on determining the type of entity movement, the threshold location.

9. The system of claim 8, wherein the processor is further configured to perform the operations comprising:
    identifying that the type of entity movement indicates that the entity is moving within each of the two or more frames; and
    inputting an entity size predictor, wherein the entity size predictor indicates a minimum size of the entity.

10. The system of claim 8, wherein the processor is further configured to perform the operations comprising:

identifying that the type of entity movement indicates that the entity is recording the two or more frames; and selecting a post frame of the two or more frames.

11. The system of claim 7, wherein the processor is further configured to perform the operations comprising:

parsing the media frame collection into the two or more frames;

extracting metadata from the two or more frames, wherein the metadata includes categorical information and location information; and tagging the media frame collection with an indicator that specifies the categorical information and location information.

12. The system of claim 11, wherein the categorical information includes information on frame size, and wherein location information indicates a designated location for each of the two or more frames from the media frame collection.

13. A computer program product comprising a computer readable storage medium having program instructions embodied therewith, the program instructions executable by a processor to cause the processor to perform operations, the operations comprising: receiving a media frame collection, wherein the media frame collection includes two or more frames;

identifying, from the media frame collection, a location of an entity;

determining whether the location of the entity is within a threshold location in regard to other frames in the media frame collection, wherein determining whether the location of the entity is within the threshold location comprises:

comparing the location of the entity to a location of each of the other frames, wherein the location of the entity is a designated location within the two or more frames, and wherein the location of the entity is associated with a centroid vector of a bucket, identifying each of the other frames that do not exceed the threshold location, and discarding each of the other frames that do not exceed the threshold location;

deleting each of the other frames that do not exceed the threshold location, wherein each of the other frames deleted is associated with the threshold location; and displaying one or more frames that exceed the threshold location to a user.

14. The computer program product of claim 13, wherein the processor is further configured to perform the operations comprising:

determining, from the comparing of the location of the entity to the location of each of the other frames, a type of entity movement;

adjusting, based on determining the type of entity movement, the threshold location.

15. The computer program product of claim 14, wherein the processor is further configured to perform the operations comprising:

identifying that the type of entity movement indicates that the entity is moving within each of the two or more frames; and inputting an entity size predictor, wherein the entity size predictor indicates a minimum size of the entity.

16. The computer program product of claim 14, wherein the processor is further configured to perform the operations comprising:

identifying that the type of entity movement indicates that the entity is recording the two or more frames; and selecting a post frame of the two or more frames.

17. The computer program product of claim 13, wherein the processor is further configured to perform the operations comprising:

parsing the media frame collection into the two or more frames;

extracting metadata from the two or more frames, wherein the metadata includes categorical information and location information; and tagging the media frame collection with an indicator that specifies the categorical information and location information.

* * * * *